(12) United States Patent
Brown

(10) Patent No.: US 7,770,612 B1
(45) Date of Patent: Aug. 10, 2010

(54) PRESSURE-ACTUATED AIR GUN

(76) Inventor: Jimmy Earle Brown, 5994 Willoughby Oak La., Bartlett, TN (US) 38135

( * ) Notice: Subject to any disclaimer, the term of this patent is extended or adjusted under 35 U.S.C. 154(b) by 0 days.

(21) Appl. No.: 12/554,425

(22) Filed: Sep. 4, 2009

(51) Int. Cl.
- *B65B 1/04* (2006.01)
- *B65B 3/04* (2006.01)
- *B61D 45/00* (2006.01)

(52) U.S. Cl. .......................... 141/193; 141/10; 141/68; 141/392; 137/224; 137/489.5; 251/149.8

(58) Field of Classification Search .................. 141/10, 141/37, 68, 192, 193, 313, 392; 137/223, 137/224, 489.5; 251/149.8
See application file for complete search history.

(56) References Cited

U.S. PATENT DOCUMENTS

| | | | |
|---|---|---|---|
| 2,818,890 A | | 1/1958 | Ryan |
| 3,859,996 A | | 1/1975 | Mizzy et al. |
| 4,102,364 A | * | 7/1978 | Leslie et al. ................. 141/10 |
| 4,146,069 A | * | 3/1979 | Angarola et al. ............. 141/68 |
| 4,146,070 A | | 3/1979 | Angarola et al. |
| 4,714,098 A | | 12/1987 | Stuckel |
| 4,733,516 A | | 3/1988 | Araki |
| 5,082,244 A | * | 1/1992 | Krier et al. ............... 251/149.6 |
| 5,367,726 A | | 11/1994 | Chaffee |
| 5,437,301 A | | 8/1995 | Ramsey |
| 5,454,407 A | | 10/1995 | Huza et al. |
| 5,566,728 A | | 10/1996 | Lange |
| 5,806,572 A | | 9/1998 | Voller |
| 5,839,488 A | * | 11/1998 | Peters ...................... 137/224 |
| 6,676,042 B2 | * | 1/2004 | Howlett et al. .............. 239/569 |
| 6,729,110 B2 | | 5/2004 | Sperry et al. |
| 6,799,614 B1 | * | 10/2004 | Smith et al. ................ 141/312 |
| 6,884,255 B1 | | 4/2005 | Newton |
| 6,929,021 B2 | * | 8/2005 | Cavenagh .................. 137/223 |
| 7,044,176 B2 | * | 5/2006 | Boni ......................... 141/38 |
| 7,066,442 B2 | | 6/2006 | Rose |

(Continued)

FOREIGN PATENT DOCUMENTS

WO     WO 2009/109910     * 11/2009

OTHER PUBLICATIONS

MSC Industrial Direct Co., Inc., Coilhose Pneumatics #26R2-GJ (MSC#: 79804449), www1.mscdirect.com/CGI/GSDRVSM?PACACHE=000000107222499# (2008), 1 page, Melville, New York, USA.

(Continued)

*Primary Examiner*—Gregory L Huson
*Assistant Examiner*—Nicolas A Arnett
(74) *Attorney, Agent, or Firm*—Walker, McKenzie & Walker, P.C.

(57) ABSTRACT

A pressure-actuated air gun having an actuating port in the nozzle of the gun such that, when the actuating port becomes blocked, as by inserting the nozzle of the gun into a coupling on an article to be inflated or deflated, air is caused to pass from a source of pressurized air to the gun. When the actuating port becomes unblocked, as by disengaging the nozzle of the gun from the coupling, air is inhibited from passing from the source of pressurized air to the gun. An air pilot actuated valve is interposed between the source and the gun, and is controlled by air pressure that builds up when the actuating port becomes blocked by the coupling.

2 Claims, 3 Drawing Sheets

U.S. PATENT DOCUMENTS

| | | | |
|---|---|---|---|
| 7,073,545 B2 * | 7/2006 | Smith et al. | 141/38 |
| 7,434,594 B1 * | 10/2008 | Robbins et al. | 137/223 |
| 7,610,929 B2 * | 11/2009 | Zielinski et al. | 141/317 |
| 2008/0185051 A1 | 8/2008 | Warnick | |

OTHER PUBLICATIONS

Norgren Ltd., R14, R16 Miniature, Preset, Nonadjustable Pressure Regulator Water and Compressed Air Service, www.norgen.com/document_resources/USA/R14,%20R16.pdf (Dec. 4, 2002), 2 pages, Littleton, Colorado, USA.

Norgren Ltd., V50—V53 Series, www.norgren.com/document_resources/EN/N_en_5_3_541_V50_V53.pdf (May 2008), 17 pages, Littleton, Colorado, USA.

MSC Industrial Direct Co., Inc., NuLine Pressure Gauge (MSC#: 56469018), www1.mscdirect.com/CGI/GSDRVSM?PACACHE=000000107227463 (2008), 1 page, Melville, New York, USA.

Norgren Ltd., Nugget 200 Spool Valves, www.norgren.com/document_resources/USA/Sec06Nug200.pdf (Nov. 6, 2002), pp. VAL-10-18, VAL-10-19, VAL-10-20, VAL-10-22, VAL-10-36; Littleton, Colorado, USA.

* cited by examiner

PRESSURE-ACTUATED AIR GUN

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to inflation of articles using a fluid such as air, and, in particular, to means for turning on and off air dispensed from an air gun used for inflation of articles.

2. Information Disclosure Statement

It is often desired to inflate articles such as dunnage bags, air mattresses, etc. Often, such inflation, such as inflation of dunnage bags when packing a cargo transport vehicle, needs to be done repetitively and quickly. Prior art solutions are known that use trigger-actuated air guns which have a nozzle that is inserted into a bore of a valve or a port of the article, and the trigger of the air gun is then squeezed to cause air to flow from a pressurized source, through the gun, and into the article while the air gun is held inserted into the valve or port on the article. The repetitive motion of inserting the air gun's nozzle into the valve or port on the article, squeezing the trigger to cause inflation and holding the trigger squeezed until full inflation is achieved, then releasing the trigger and removing the nozzle of the air gun from the article, becomes tiring to laborers operating the air gun to inflate articles.

It is therefore desirable to have an improved air gun that actuates automatically to release air when the air gun is inserted into the valve or port of an article being inflated and which also stops releasing air when the air gun is removed from the valve or port of the article.

A preliminary patentability search in Class 141, Subclasses 361, 226, 193, 321, 347, 348, 67, 68, 10, 349, digest 2; Class 137, Subclasses 231, 223, 224; and Class 251, Subclass 149.8, produced the following patents and published applications, some of which may be relevant to the present invention: Warnick, U.S. Appl. Publication 2008/0185051 A1 (published Aug. 7, 2008); Newton, U.S. Pat. No. 6,884,255 (issued Apr. 26, 2005); Sperry et al., U.S. Pat. No. 6,729,110 (issued May 4, 2004); Voller, U.S. Pat. No. 5,806,572 (issued Sep. 15, 1998); Lange, U.S. Pat. No. 5,566,728 (issued Oct. 22, 1996); Huza et al., U.S. Pat. No. 5,454,407 (issued Oct. 3, 1995); Ramsey, U.S. Pat. No. 5,437,301 (issued Aug. 1, 1995); Chaffee, U.S. Pat. No. 5,367,726 (issued Nov. 29, 1994); Araki, U.S. Pat. No. 4,733,516 (issued Mar. 29, 1988); Stuckel, U.S. Pat. No. 4,714,098 (issued Dec. 22, 1987); Angarola et al., U.S. Pat. No. 4,146,070 (issued Mar. 27, 1979); Mizzy et al., U.S. Pat. No. 3,859,996 (issued Jan. 14, 1975); and Ryan U.S. Pat. No. 2,818,890 (issued Jan. 7, 1958).

Additionally, Rose, U.S. Pat. No. 7,066,442 (issued Jun. 27, 2006) discloses use of a low-pressure air gun to inflate a dunnage bag.

None of these references, either singly or in combination, discloses or suggests the present invention.

BRIEF SUMMARY OF THE INVENTION

The present invention is a pressure-actuated air gun having an actuating port in the nozzle of the gun such that, when the actuating port becomes blocked, as by inserting the nozzle of the gun into a coupling on an article to be inflated or deflated, air is caused to pass from a source of pressurized air to the gun. When the actuating port becomes unblocked, as by disengaging the nozzle of the gun from the coupling, air is inhibited from passing from the source of pressurized air to the gun.

It is an object of the present invention to provide an improved air gun that actuates automatically, without activation of a trigger by an operator, to release air when the air gun is inserted into the valve or port of an article being inflated and which also automatically stops releasing air when the air gun is removed from the valve or port of the article.

DETAILED DESCRIPTION OF THE INVENTION

Figure 1:
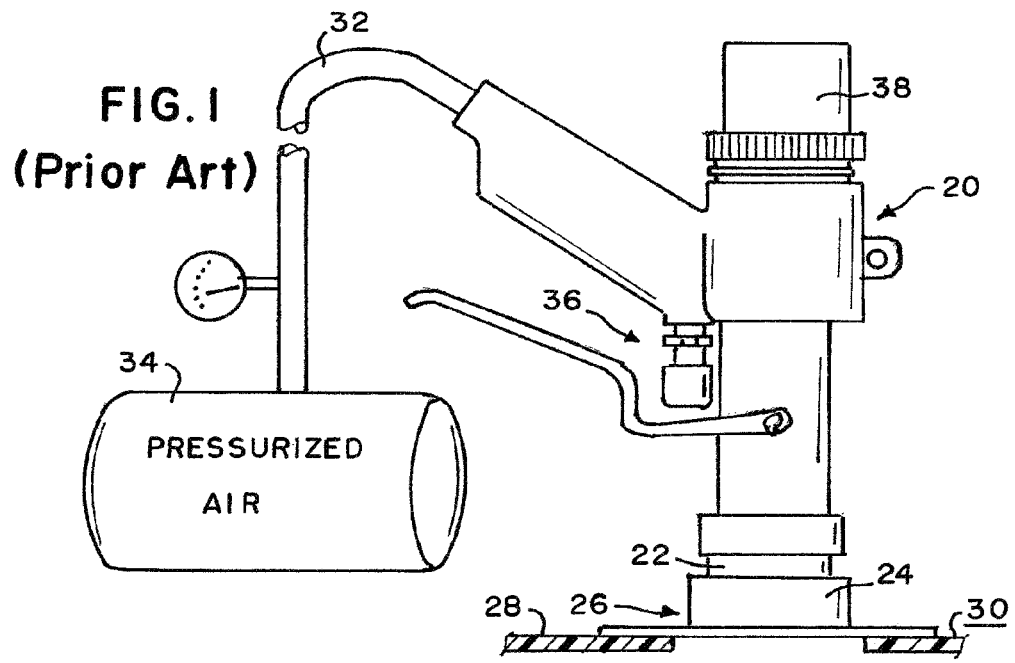
FIG. 1 is a view a prior art trigger-actuated air gun inserted into a valve on an article for inflation.

Referring to FIG. 1, a prior art trigger-actuated air gun 20 is shown with its nozzle 22 inserted into a coupling 24 of a valve or port 26 through a wall 28 of an article 30 such as a well-known dunnage bag. Prior art gun 20 is connected as through a well-known hose 32 to source 34 of pressurized air, and a trigger-operated valve 36 in gun 20 selectively permits air to flow from air source 34 through gun 20. Prior art gun 20 is a well-known air gun sold under the trademark Hand-E-Vac, catalog number 2001, made by ITW Vortec, an Illinois Tool Works Company, 10125 Carver Rd., Cincinnati, Ohio 45242-4798. Prior art gun 20 is lightweight and, by removing the rear portion 38 and reversing an internal Bernoulli-effect insert within gun 20 and then replacing rear portion 38, the gun can permit rapid inflation or deflation of the vessel using the same pressurized air source 34.

With this background, and now referring to FIGS. 2-5, the present invention can now be disclosed in detail.

Figure 2:
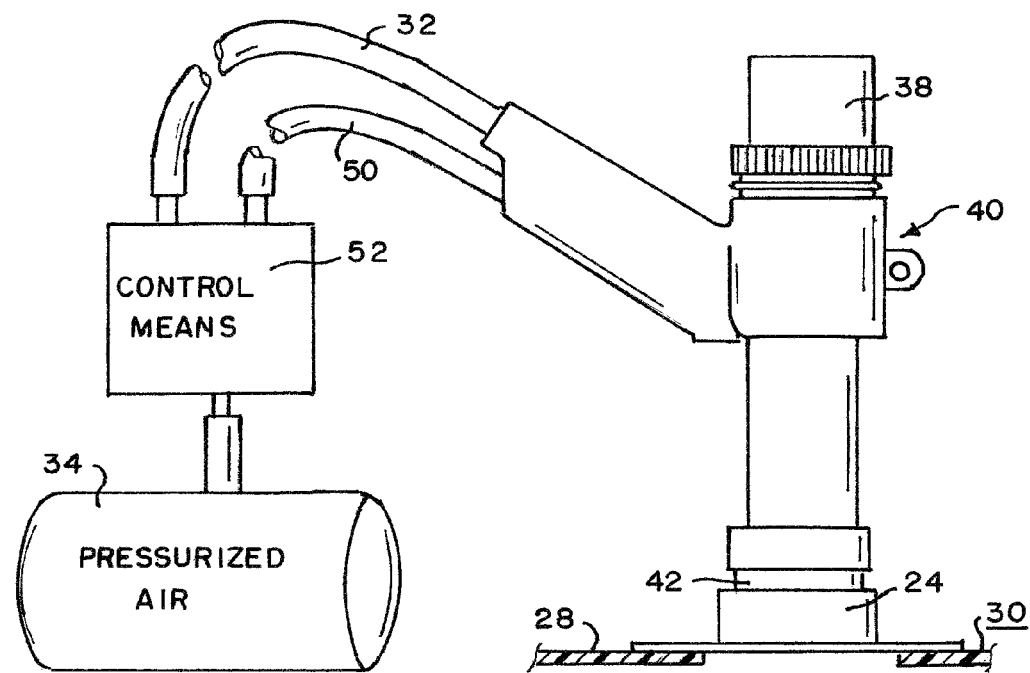
FIG. 2 is a view of the improved air gun of the present invention inserted into a valve on a article for inflation.
Figure 3:
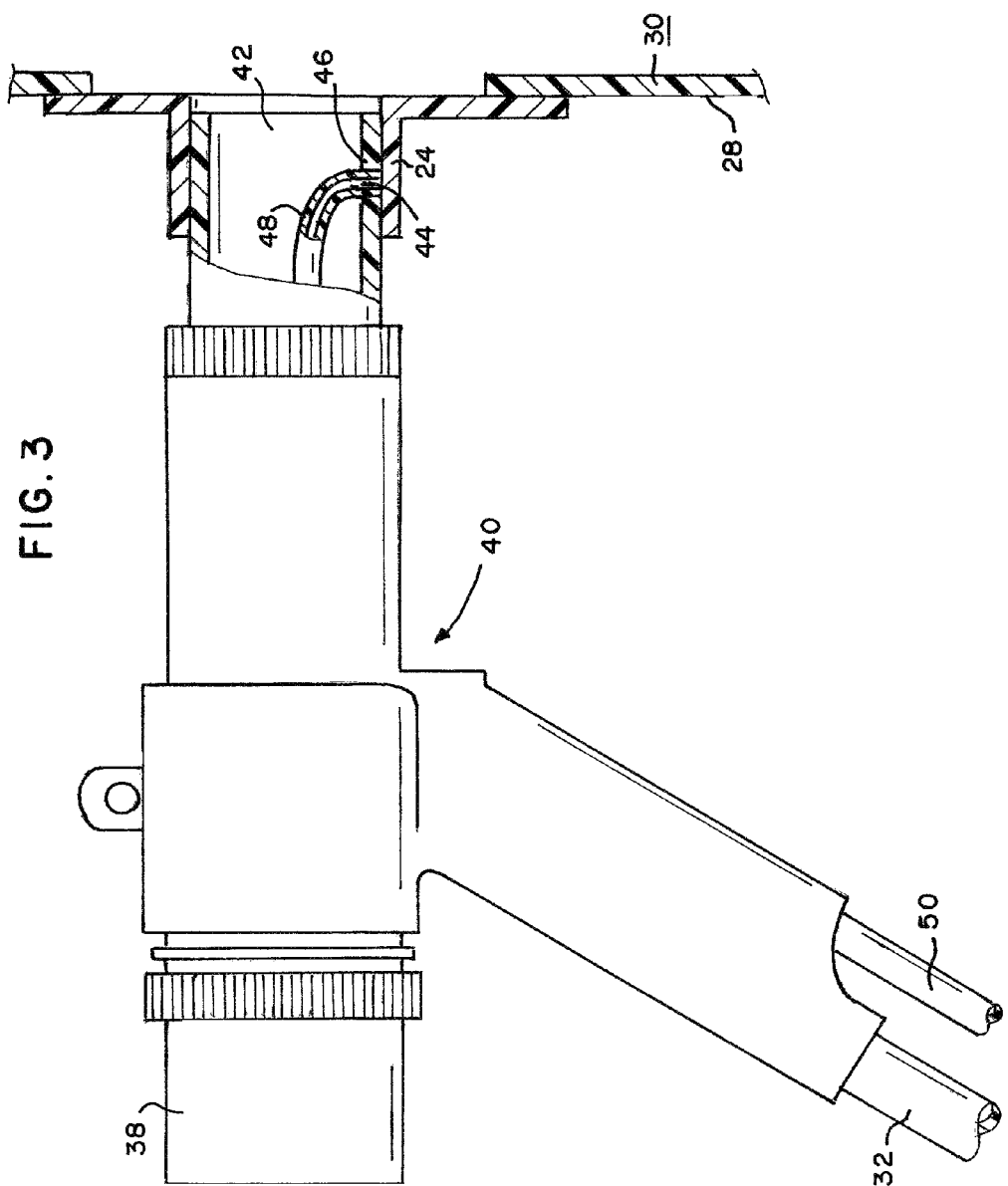
FIG. 3 is a side view of the improved air gun of the present invention inserted into a valve on an article for inflation, with portions of the nozzle removed to show the details of the sensing port.

The present invention is an improved air gun 40 for use with a source 34 of air under pressure to alter the inflation of an article 30 by either inflating or deflating the article in a manner hereinafter described. As with the prior art gun 20, FIG. 2 shows gun 40 with its nozzle 42 inserted into a coupling 24 of a valve or port 26 through a wall 28 of an article 30 such as a well-known dunnage bag. Gun 40 is connected as through a well-known hose 32 to source 34 of pressurized air with control means 52, hereinafter described, being interposed between gun 40 and air source 34.

Preferably, air gun 40 is a modified version of the well-known prior art air gun sold under the trademark Hand-E-Vac, catalog number 2001, made by ITW Vortec, an Illinois Tool Works Company, 10125 Carver Rd., Cincinnati, Ohio 45242-4798. Gun 40 has been modified to remove the trigger and trigger valve present in prior art gun 20, with the hole for the trigger valve being plugged. The nozzle 42 of gun 40 has been modified to have an actuating port 44 through a sidewall 46 of nozzle 42, with actuating port 44 being operably coupled, through hollow tube 48 and hose 50, to control means 52 for selectively causing a flow of air to pass from the source 34 of pressurized air to gun 40. As with prior art gun 20, gun 40 is lightweight preferably includes a Bernoulli-effect insert therewithin such that, by removing the rear portion 38 and reversing the internal Bernoulli-effect insert within gun 40 and then replacing rear portion 38, the gun 40 can permit rapid inflation or deflation of the vessel using the same pressurized air source 34. It shall be understood by those versed in the art that, when the Bernoulli-effect insert within gun 40 is inserted one way, the flow of air from source 34 is directed out the nozzle 42 of the gun 40, permitting use of gun 40 to inflate the article 30 and, when the Bernoulli-effect insert within gun 40 is reversed, the flow of air from source 34 is directed out the rear portion 38 of the gun 40, drawing air into the gun 40 through nozzle 42 and expelling that drawn air out the rear portion 38 of gun 40 by the well-known Bernoulli effect.

Figure 4:
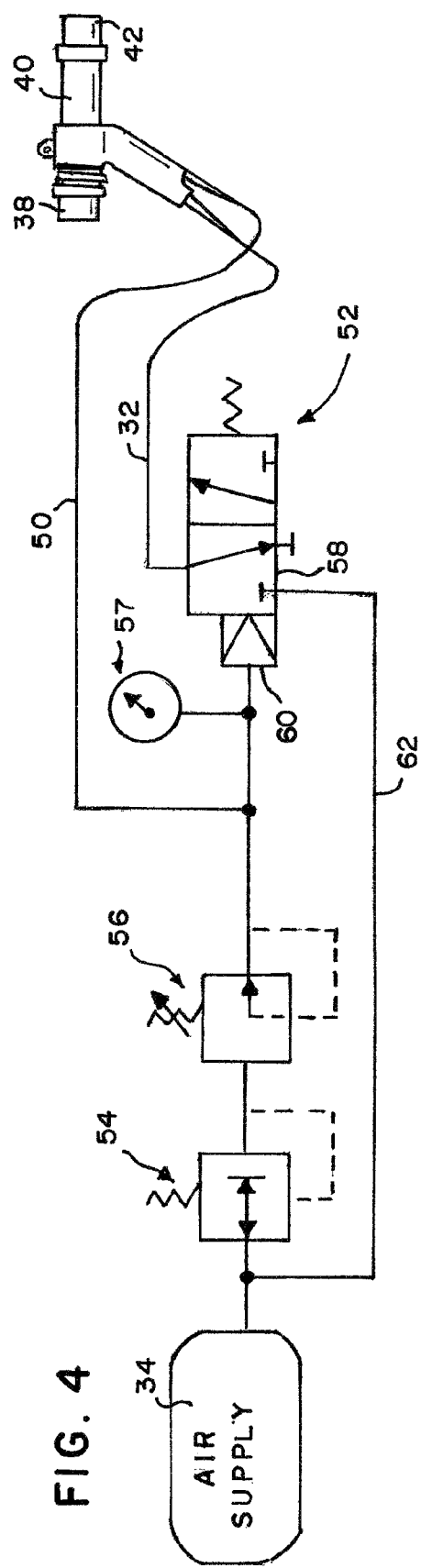
FIG. 4 is a schematic view of the control means of the present invention interposed between the source of air under pressure and the improved air gun of the present invention.
Figure 5:
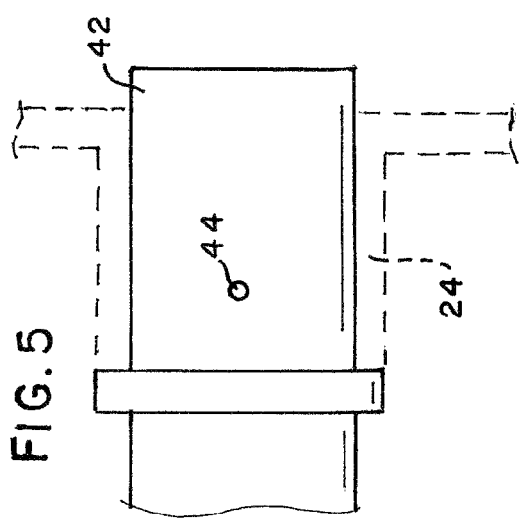
FIG. 5 is a view of the nozzle of the air gun of the present invention, with portions of the valve's coupling in dotted outline and showing the sensing port.

Referring to FIG. 4, the parts of control means 52 and those parts to which control means 52 connects can now be described in greater detail.

Air source 34 is well-known and typically supplies air at a pressure of 90 to 120 pounds per square inch ("PSI"). A first regulator 54 and a second regulator 56 are preferably provided in series with air source 34 to reduce the air pressure to a control pressure of about two to five PSI through hose 50. First regulator 54 is preferably a well-known 15 PSI non-adjustable regulator having a ¼ gauge port manufactured and sold by Norgren Ltd., Littleton, Colo., U.S.A., and sold by MSC Industrial Direct Co., Inc., MSC Part #1777K2. Second regulator 56 is preferably a compact extra-low range adjustable regulator having a ¼ gauge port, part number 26R2-GJ, manufactured by Coilhose Pneumatics, 19 Kimberly Road, East Brunswick, N.J., U.S.A., and sold by MSC Industrial Direct Co., Inc., MSC Part #79804449. A well-known 0-15 PSI pressure gauge 57 may be provided to facilitate the pressure adjustment of regulator 56, such as a well-known pressure gauge manufactured by NuLine and sold by MSC Industrial Direct Co., Inc., MSC Part #56469018.

Control means 52 preferably includes an air pilot actuated valve 58 interposed between source 34 and gun 40. Valve 58 has an air pilot 60 control input that causes valve 58 to actuate when the pressure at air pilot 60 rises to a predetermined value, typically 2.5 PSI. Valve 58 is preferably a pilot actuated three-way spool valve manufactured by Norgren Ltd., Littleton, Colo., having a Norgren Part #K41DA00-KS1-KA6. It is seen that air pilot 60 is in communication with actuating port 44 through hose 50 and tube 48.

When nozzle 42 of gun 40 is not inserted into coupling 24 (and is thus disengaged from coupling 24), actuating port 44 is not blocked, causing the pressure in tube 48 and hose 50 to drop, thereby causing the pressure at air pilot 60 control input to drop, causing valve 58 to block air pressure from flowing through line 62 to hose 32, thereby blocking the flow of air to gun 40. When nozzle 42 of gun 40 is insertingly engaged into coupling 24, actuating port 44 becomes blocked by coupling 24 thereagainst as seen best in FIG. 3, such that air pressure builds up in tube 48 and hose 50, thereby causing the air pressure at air pilot 60 control input to rise, causing valve 58 to pass air from source 34, through line 62 and hose 32, to the gun.

To use the gun 40 of the present invention, first the operator decides whether the gun is to be used to deflate or inflate the article 30 and orients the Bernoulli insert in the gun 40 accordingly for inflation or deflation.

The operator then causes the air supply 34 to become pressurized and inserts the nozzle 42 of gun 40 into the coupling 24 of each article 30 to be inflated or deflated. Upon insertion of the nozzle 42 into the coupling 24, actuating port 44 will become blocked, causing valve 58 to pass pressurized air to gun 40, and the article will be inflated or deflated, as desired, without any trigger actuation by the operator. Upon removal of the nozzle 42 from coupling 24, actuating port 44 will become unblocked, causing valve 58 to inhibit the passage of pressurized air from source 34 to gun 40.

Although the present invention has been described and illustrated with respect to a preferred embodiment and a preferred use therefor, it is not to be so limited since modifications and changes can be made therein which are within the full intended scope of the invention.

I claim:

1. An improved air gun for use with a source of air under pressure to alter the inflation of an article, said gun having a nozzle for passing air therethrough when said nozzle is engaged with a coupling, said nozzle having a sidewall, wherein the improvement comprises control means for selectively causing a flow of air from said air under pressure to pass from said source to said gun; said sidewall of said nozzle having an actuating port therethrough operably coupled to said control means; said control means being responsive to the blocking and unblocking of said actuating port by said coupling when said nozzle is respectively engaged and disengaged therewith; such that, when said actuating port is blocked, said control means causes said flow of air to pass from said source to said gun and such that, when said actuating port is unblocked, said control means inhibits said flow of air from passing from said source to said gun.

2. The improved air gun as recited in claim 1, in which said control means includes an air pilot actuated valve interposed between said source and said gun, said air pilot of said air pilot actuated valve being in communication with said actuating port.

\* \* \* \* \*